Dec. 15, 1931.    C. A. XARDELL    1,836,520
PERCOLATOR
Filed May 29, 1930
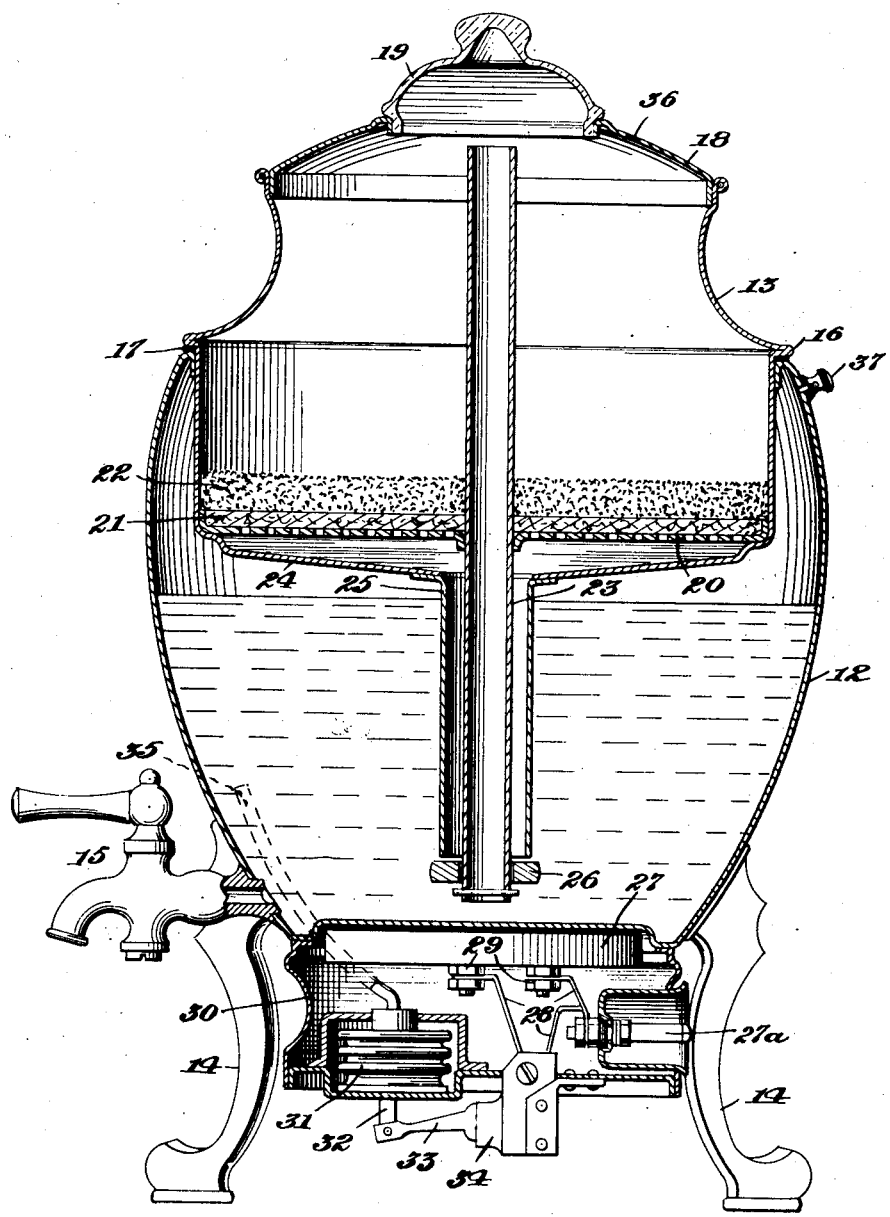
Inventor:
Charles A. Xardell,
by Calvin Kahn
Att'ys.

Patented Dec. 15, 1931

1,836,520

UNITED STATES PATENT OFFICE

CHARLES A. XARDELL, OF UTICA, NEW YORK, ASSIGNOR TO THE BOSSERT CORPORATION, OF UTICA, NEW YORK, A CORPORATION OF NEW YORK

PERCOLATOR

Application filed May 29, 1930. Serial No. 457,047.

This invention relates to electric percolators and has for its object to provide a vessel of this sort comprising two containers in the upper one of which may be placed the coffee or other material of which the infusion is to be made, and the lower one of which is to contain the liquid which is caused by steam pressure to be forced upward through a transfer tube extending some distance above the material in the upper vessel, such liquid passing through such material and through the perforated false bottom of the upper container so as to be returned to the lower container through a drip tube. The improved percolator is equipped with an automatic controlling device which will break the circuit when a predetermined degree of heat has been established, thereby avoiding damage by overheating.

The accompanying drawing is a sectional view of the improved percolator embodying the present invention.

Referring to the drawing, 12 denotes the body of the percolator which serves as the lower container into the top of which is removably fitted an upper container 13, said lower container being provided with legs 14 and with a spigot 15 for the withdrawal of liquid therefrom. The upper container 13 is constructed with a peripheral flange 16 between which and the top of the lower container is preferably fitted a gasket 17 to make a tight joint. Fitting in the top of the upper container is a removable cover 18 the top portion of which consists of a dome-like glass deflector 19. The upper container is equipped with a perforated removable false bottom 20, and a filter pad 21 will preferably be placed on said false bottom when the percolator is in use, the coffee or other material 22, an infusion of which is to be made, being placed on said filter pad.

Fitting in and supported by the false bottom 20 is a transfer tube 23 which extends upward from near the bottom of the lower container 12 to a point near the deflector 19. To the center of the inwardly sloping, imperforate bottom 24 of the upper container is attached a drip tube 25 down through which liquid passing through the perforated false bottom will flow to a point near the bottom of the lower container. The transfer tube extends centrally down through said drift tube.

Encircling the bottom of the transfer tube 23 is a float valve of cork or other buoyant material which will normally close the bottom of the drip tube 25 until forced downward against a retaining pin 23ª by the weight of the liquid in the said drip tube or by pressure.

The electric heating element 27 is located below the bottom of the lower container and is heated by the current passing to and from the terminals 27ª through the conductors 28 attached to the binding posts 29 at the bottom of said heating element. The bottom of the lower container is flat and the heating element, which is in the form of a disk, is located in juxtaposition to said flat bottom of said container, this construction of these parts ensuring a rapid heating of the liquid in said lower container. Suitably supported by the base 30 of the percolator is a bellows 31 of thin spring metal, said bellows being connected by a part 32 with a lever 33 controlling a snap switch located within the housing 34. As the bellows and snap switch controlled thereby are commercial devices which may be bought in the open market and which therefore do not of themselves constitute a part of the present invention, the details thereof need not be further described. Connected with the bellows 31 is a heating tube 35 passing upward against the outside of the lower container 12 or it may extend into the liquid in said chamber. The bellows 31 and heating tube 35 will preferably be filled with a volatile liquid which by its expansion by heat will operate the switch lever 33 to shut off the current when a predetermined dangerously high degree of heat is arrived at. When the liquid cools somewhat the spring metal bellows will contract by its resilience to restore the current circuit automatically, or remain shut off, depending on the type of switch.

In the operation of the percolator a suitable quantity of liquid will be placed in the lower container and the ground coffee or other material of which the infusion is to be made, will be placed in the upper container. When the current is turned on and the liquid in the lower container becomes suitably heated steam will be formed in the upper part of the chamber of said lower container and the steam pressure on the liquid in the lower part of the chamber of said container will force the liquid upward through the transfer tube 23 causing it to strike against the deflector 19 and to be spilled out onto and through the ground coffee in the upper container and then through the filter pad 21 and the perforated false bottom 20 to the inwardly sloping bottom 24 of said upper container and thence downward through the drip tube 25, forcing the float valve downward by its weight or by pressure, this operation continuing until an infusion of the desired strength has been produced, when the current may be shut off.

In the early stages of the steam pressure in the upper part of the chamber of the lower container, and before the water is sufficiently heated, it is desirable that water should be prevented from passing up through the transfer tube. To this end the lower container 24 is provided at its upper part, above the level of the liquid therein, with a relief valve 37, so that there will not be sufficient pressure on the liquid in the lower container until a proper degree of heat is arrived at and more steam is produced than can escape at the said relief valve which will be adjusted as may be desired. During this time when the percolator is being properly heated the lower end of the drip tube will be closed by the float valve 26, until said valve is forced downward, as hereinbefore explained.

To prevent the formation of a vacuum in the percolator due to condensation of steam, the cover 18 is preferably provided with a vent aperture 36.

It will be understood, of course, that the upper container 13 with all the parts connected therewith or enclosed therein may be readily removed from the lower container, so that all of these parts may be taken out for cleaning when desired.

From the foregoing it will be understood that the invention provides an efficient percolator which is automatic in operation so that danger from overheating will be avoided.

Having thus described my invention, I claim and desire to secure by Letters Patent:

1. An electric percolator comprising a lower liquid-holding container, an upper material-holding container removably mounted on said lower container, an electric heating element for said lower container, transfer and drip tubes supported by said upper container, a float valve for closing the bottom of said drip tube at times, electric connections for said heating element, and automatic means, comprising a snap switch, for controlling the electric current to prevent overheating.

2. An electric percolator comprising a lower liquid-holding container, an upper material holding container removably mounted on said lower container and having an inwardly sloping bottom, a drip tube attached to the central part of said bottom and down through which liquid may flow from said bottom, a perforated false bottom supported above said first-named bottom, a transfer tube attached to the central part of said false bottom and extending downward from a point near the top of said upper container through said drip tube to a point below the bottom of the latter, an electric heating element below said lower container, and automatic means, comprising a snap switch, for controlling the electric current to prevent overheating.

3. An electric percolator comprising a lower liquid-holding container provided at its upper part with a relief valve, an upper material holding container removably mounted on said lower container and having an inwardly sloping bottom, a drip tube attached to the central part of said bottom and down through which liquid may flow from said bottom, a perforated false bottom supported above said first-named bottom, a transfer tube attached to the central part of said false bottom and extending downward from a point near the top of said upper container through said drip tube to a point below the bottom of the latter, an electric heating element below said lower container, and automatic means, comprising a snap switch, for controlling the electric current to prevent overheating.

4. An electric percolator comprising a lower liquid-holding container, an upper material holding container removably mounted on said lower container and having a vent opening and an inwardly sloping bottom, a drip tube attached to the central part of said bottom and down through which liquid may flow from said bottom, a perforated false bottom supported above said first-named bottom, a transfer tube attached to the central part of said false bottom and extending downward from a point near the top of said upper container through said drip tube to a point below the bottom of the latter, an electric heating element below said lower container, and automatic means, comprising a snap switch, for controlling the electric current to prevent overheating.

5. An electric percolator comprising a lower liquid-holding container, an upper material holding container removably mounted on said lower container and having an inwardly sloping bottom, a drip tube attached to the central part of said bottom and down through which liquid may flow from said bottom, a float valve for closing the bottom of said drip tube, at times, a perforated false bottom supported above said first-named bottom, a transfer tube attached to the central part of said false bottom and extending downward from a point near the top of said upper container through said drip tube to a point below the bottom of the latter, an electric heating element below said lower container, and automatic means, comprising a snap switch, for controlling the electric current to prevent overheating.

In testimony whereof I affix my signature.

CHARLES A. XARDELL.